United States Patent [19]

Kelly

[11] Patent Number: 4,978,436
[45] Date of Patent: Dec. 18, 1990

[54] CORONA-DISCHARGE TREATED RELEASE FILMS

[75] Inventor: Peter Y. Kelly, Kingston, Canada

[73] Assignee: Du Pont Canada Inc., Mississauga, Canada

[21] Appl. No.: 388,926

[22] Filed: Aug. 3, 1989

[30] Foreign Application Priority Data

Aug. 5, 1988 [GB] United Kingdom ................. 8818689

[51] Int. Cl.$^5$ .......................... H05F 3/00; B29C 35/10
[52] U.S. Cl. .................................... 204/165; 204/168; 204/169; 428/391; 428/447; 264/22; 264/211.24
[58] Field of Search ....................... 204/165, 168, 169; 428/391, 447; 264/22, 211.24

[56] References Cited

U.S. PATENT DOCUMENTS

| | | | |
|---|---|---|---|
| 2,778,793 | 1/1957 | Thomas et al. | 204/165 |
| 3,726,710 | 4/1973 | Berger et al. | 204/165 |
| 4,288,497 | 9/1981 | Tanaka et al. | 428/447 |
| 4,446,090 | 5/1984 | Lovgren et al. | 524/265 |

FOREIGN PATENT DOCUMENTS 60-123576  7/1985  Japan .

*Primary Examiner*—John F. Niebling
*Assistant Examiner*—David G. Ryser

[57] ABSTRACT

Polyolefin coatings and films having release characteristics, also known as release sheets, are disclosed. The release sheets are formed by treating a sheet formed from polyolefin and dimethyl polysiloxane having functional end groups with a corona discharge. In a preferred embodiment, the release sheet is formed from polyolefin, the dimethyl polysiloxane, vinyl silane, an agent to graft the vinyl silane onto the polyolefin and a moisture curing agent by extrusion in the form of sheet, treating the sheet with a corona discharge and then subjecting the sheet to moisture. The release sheets may be used, for instance, as the backing sheet for labels.

5 Claims, No Drawings

CORONA-DISCHARGE TREATED RELEASE FILMS

The present invention relates to polyolefin coatings and films having release or peelability characteristics and especially to so-called release films that have been formed from polyethylene compositions. In particular, the present invention relates to release films that have been treated with a corona discharge.

Polyolefins and especially polyethylene may be used in a wide variety of end-uses, including in the form of films, coatings and the like. Such films and coatings may have heat sealing characteristics and be intended to be bonded or sealed to the same or a similar type of coating e.g. as in the packaging of materials. However, in some instances the films or coatings are intended to exhibit slip, release, peelability or related characteristics, for example be in the form of peelable coatings on adhesive materials, in the form of a removable protective layer over a substrate, including substrates in sheet form that have surfaces that are sensitive to contaminants e.g. dust or other soiling matter, or be in the form of coatings having slip characteristics that are intended to facilitate use of the coated material on high speed packaging apparatus. The latter types of coatings or sheets are frequently referred to as release coatings, films or sheets, peelable films, coatings or sheets or slip coatings, and will generally be referred to herein as release films.

Release films are known. For example, Japanese Kokai Pat. application No. 61-200879 of Y. Minamizaki et al, published 1986 Sept. 05, discloses a peelable laminated film that is formed by extruding a composition of a moisture-curable silicone and thermoplastic polymer onto a substrate, and then subjecting the resultant coating to moisture. The compositions are formed from a thermoplastic polymer, a diorganosiloxane having silanol groups, a crosslinking agent and a curing agent. The polymer is exemplified by low density polyethylene and the cross-linking agent is exemplified by vinyl triacetoxy silane, trisbutanoxime vinyl silane, vinyl trimethoxy silane, phenyl trimethoxy silane, vinyl triisopropenoxy silane, divinyl tetramethoxy disiloxane and hexamethyl bisdimethylaminoxy cyclotetrasiloxane. Examples of the curing agents are organotin and organotitanium compounds, and amines.

Easily peelable films formed from 0.1-10 parts of a silicone oil and 100 parts of polyolefin are disclosed in Japanese Kokai Pat. application No. 62-85930 of Y. Hirano et al, published 1986 Apr. 15. A release film for the packaging of tacky materials is disclosed in Japanese Kokai Pat. application 62-85930 of T. Toto et al, published 1987 Apr. 20. The film is formed by extrusion of a composition of a polyolefin and a radiation-curable siloxane in the form of a cylindrical film, which is then irradiated.

A film having release characteristics and processes for the manufacture thereof have now been found.

Accordingly, the present invention provides a release film comprising a polyolefin and a dimethyl polysiloxane having functional end groups, said film having been treated with a corona discharge.

In a preferred embodiment of the film of the present invention, the release film has been moisture crosslinked by means of at least one vinyl silane compound, at least a portion of which is grafted to the polyolefin.

The present invention also provides a process for the formation of a film having release characteristics, said process comprising:
(a) admixing in an extruder a composition comprising (i) a polyolefin in molten form, (ii) a dimethyl polysiloxane having functional end-groups, (iii) an agent for the grafting of vinyl silane compounds onto the polyolefin, (iv) at least one vinyl silane compound in an amount that is equal to or in excess of the stoichiometric amount that may be grafted onto the polyolefin using the grafting agent of (iii), and (v) a moisture curing agent;
(b) extruding said composition through a die at a temperature above the melting point of the polyolefin and so as effect grafting of the vinyl silane onto the polyolefin;
(c) subjecting the film thus formed to a corona discharge; and
(d) subjecting the resultant film to moisture.

In a further embodiment, the dimethyl polysiloxane is fed into the extruder, directly into a melt zone of the extruder.

In another embodiment, at least two compositions which in combination form the composition to be extruded, are each fed to the extruder.

In further embodiments, the composition fed to the extruder is in the form of two fractions, the first fraction comprising polyolefin, vinyl silane and dimethyl polysiloxane, said polyolefin optionally having at least one vinyl silane compound grafted thereon in an amount that is substantially less than the stoichiometric amount that may react with the functional groups on the polysiloxane; and the second fraction comprising polyolefin, vinyl silane and dimethyl polysiloxane, said polyolefin having at least one vinyl silane compound grafted thereon in an amount that is at least a major fraction of the stoichiometric amount that may react with the functional groups on the polysiloxane.

The present invention relates to release films and processes for the manufacture thereof, and especially to release films that have been subjected to a corona discharge in order to improve the release characteristics thereof. The release films are formed from polyolefins, especially homopolymers and copolymers of unsaturated hydrocarbons having 2–10 carbon atoms. In particular, the polymers are homopolymers of ethylene or propylene or copolymers of ethylene with alpha-olefin hydrocarbons having 3–10 carbon atoms, especially butene-1 and octene-1. In particularly preferred embodiments, the polyolefins are copolymers of ethylene with a hydrocarbon alpha-olefin having from 4–8 carbon atoms and having a density in the range of 0.900 to 0.970 g/cm$^3$ and especially in the range of 0.920 to 0.930 g/cm$^3$. In further embodiments, the polymers have a melt index in the range of 0.05 to 120 dg/min, especially 0.1 to 75 dg/min and in particular in the range of 5 to 15 dg/min.

In alternative embodiments, the polyolefin may be a copolymer of ethylene and a polar monomer e.g. an ethylenically unsaturated carboxylic acid, or ester thereof, or an ethylenically unsaturated ester of a carboxylic acid. Examples of such copolymers of ethylene include ethylene/acrylic acid copolymers, ethylene/methacrylic acid copolymers, ethylene/alkyl acrylate copolymers and ethylene/alkyl methacrylate copolymers especially where the alkyl group is methyl, ethyl, propyl or butyl, and ethylene/vinyl acetate copolymers.

Mixtures and blends of the polyolefins may be used.

In general, the polymers are polymers of the type that may be extruded in the form of film, including in the form of sheet and coatings, especially coatings onto paper substrates.

The polyolefin may contain additives, for example antioxidants and other stabilizers, anti-block and slip agents and the like. The polyolefin may also contain fillers e.g. talc, mica, calcium carbonate, and the like and/or pigments e.g. titanium dioxide. In addition, the polyolefin may contain modifying polymers e.g. rubber-like modifying polymers for example ethylene/propylene/diene and other elastomers. It is to be understood that any additive must not cause undue adverse effects on the release properties, in particular, of the release film.

The release film also contains a dimethyl polysiloxane having functional end groups. The preferred functional end group is the hydroxyl group. Such dimethyl polysiloxanes are commercially available, for example as silanol-terminated dimethyl polysiloxane from Petrarch Systems Inc. of Bristol, Pa., U.S.A. under the trade name PS343. However, dimethyl polysiloxanes having other terminal groups that are reactable with vinyl silanes, especially when grafted onto polyolefins, may be used e.g. polysiloxanes with amine, epoxy, methoxy groups or the like. In addition, the polysiloxane may be a moisture-crosslinkable polysiloxane, in which event the amount of vinyl silane used in the manufacture of the release film may be lowered. In preferred embodiments, the dimethyl polysiloxane is of the formula:

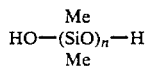

where Me=methyl and n is in the range of 100 to 100 000.

In preferred embodiments, the release film also contains at least one vinyl silane compound, which will usually be in a combined form as a result of moisture cross-linking of the film rather than being in a per se state. The vinyl silane used in the manufacture of the release film may be, for example, vinyl trimethoxy silane, vinyl triethoxy silane, vinyl triacetoxy silane, tris-butanoxime vinyl silane, phenyl trimethoxy vinyl silane, vinyl triisopropenoxy silane, divinyl tetramethoxy disiloxane, hexamethyl bisdimethylaminoxy cyclotetrasiloxane and the like. Mixtures of such silanes may be used. Part of the vinyl silane will be so-called "free silane" in which, prior to moisture treatment of the release film, the silane is not bound to or reacted with the polyolefin. The remainder of the silane will be in the form of silane grafted on to the polyolefin, as is described in greater detail hereinafter. The vinyl silane is preferably grafted in part to the polyolefin.

Release films containing vinyl silane will have been subjected to moisture to effect cross-linking by means of the vinyl silane compounds. Such moisture may be atmospheric moisture, water, steam or the like, as will be appreciated by persons skilled in the art of moisture cross-linking using vinyl silane compounds.

Processes for the manufacture of release films of the type described above are disclosed in the copending patent application of P.V. Gudelis filed simultaneously herewith. In such processes, polyolefin, dimethyl polysiloxane, vinyl silane compound, a grafting agent and a cross-linking catalyst are all fed to an extruder. The extruder should be capable of forming a uniform mixture of such components and of extruding a uniform mixture in the form of a molten web so as to form a film, which may be in the form of a sheet or a coating on a substrate. The process should be operated in the absence of moisture prior to the extrusion of the composition from the extruder, to reduce premature cross-linking reactions of the vinyl silane.

As discussed in the application of P.V. Gudelis, the components that form the release film may be fed to the extruder in a number of ways. For instance, all components may be fed to the hopper of the extruder, using suitable carrier materials where appropriate, as is described in greater detail below. In alternative procedures, some of the components may be fed through the hopper of the extruder and the remainder fed directly into the extruder. For example, the polyolefin may be fed to the hopper and heated in the extruder until in a molten condition. Subsequently, the remaining ingredients may be introduced into the extruder by means of suitable feed ports on the extruder. For instance, the remaining ingredients may be fed into a cavity transfer mixer located in the extruder after the barrel of the extruder containing the extruder screw and prior to the extrusion die or other orifice through which the polymer is extruded. Cavity transfer mixers are known and are used for admixing of two or more materials in an extruder immediately prior to extrusion. Alternatively, the remaining ingredients may be introduced into the extruder through a gear pump, which is also known for the introduction of ingredients into an extruder.

In embodiments of the process disclosed by P.V. Gudelis, polyolefin is fed to the extruder through the hopper of the extruder. The polyolefin is heated in the extruder to form molten polymer. The molten polymer is then admixed with the remaining components of the composition, for example using the cavity transfer mixer. Thus, the dimethyl polysiloxane, vinyl silane, grafting agent and cross-linking catalyst are each fed into the molten polymer. This may be done simultaneously or the components may be fed into the molten polymer in two or more stages. It is important that the introduction of the components of the composition and the mixing capabilities of the apparatus being used be such that a uniform mixture be formed in the extruder and extruded therefrom.

The grafting agent is an organic peroxide, examples of which are dicumyl peroxide, bis(tert. alkyl peroxy alkyl) benzene especially bis(tert. butyl peroxyisopropyl) benzene which is available under the trade mark Vulcup, and acetylenic diperoxy compounds especially 2,5-dimethyl-2,5-di(t-butylperoxy) hexane and 2,5-dimethyl-2,5-di(t-butylperoxy) hexyne-3, which are available commercially under the trade marks Lupersol 101 and 130, respectively. The preferred grafting agent is bis(tet. butyl peroxyisopropyl) benzene. The grafting agent grafts the vinyl silane onto the polyolefin and is preferably used in the manufacture of release films; absence of grafted vinyl silane may adversely affect properties of the release films, especially the processability of the compositions that form the release films, as is discussed in the application of P.V. Gudelis.

The cross-linking agent is an organometallic compound, especially an organotin compound. The preferred cross-linking agent is dibutyl tin dilaurate.

Compositions containing vinyl silane, organic peroxide and cross-linking agent are commercially available, for example under the trade mark Silcat R. The latter is believed to contain vinyl triethoxy silane, dicumyl peroxide and tin dilaurate.

In alternate embodiments, as is disclosed by P.V. Gudelis, components of the composition are fed to the hopper of the extruder and more preferably all of the components are fed to the hopper as at least two separate fractions. In the embodiments in which all of the components are fed to the hopper, examples of the amounts of the components are as follows, all amounts being by weight of the polyolefin: 1 to 20%, and especially 4 to 7%, of dimethyl polysiloxane in each of the first and second fractions; 0.01 to 1.0%, and especially 0.1 to 0.5%, of vinyl silane in each of the first and second fractions; 1 to 100 ppm and especially 10 to 75 ppm of the grafting agent, with the provisos that (i) the amount of grafting agent in the first fraction is such that the amount of vinyl silane that may be grafted onto the polyolefin is only a minor portion of the stoichiometric amount that may react with the functional groups of the polysiloxane and (ii) the amount of grafting agent in the second fraction is such that the amount of vinyl silane that may be grafted onto the polyolefin is at least a major portion of that stoichiometric amount; and 1 to 100 ppm and especially 5 to 50 ppm of the cross-linking catalyst. An example of a preferred composition is 60% by weight of a blend of 92.8% by weight of Sclair ® 61B polyethylene and 7.2% by weight of dimethyl polysiloxane blended with 40% by weight of a blend of 95.5% by weight of Sclair ® 61B polyethylene, 4.4% by weight of dimethyl polysiloxane, 0.04% by weight of Silcat R vinyl silane composition and 0.06% by weight of vinyl triethoxysilane; Sclair ® 61B polyethylene is a linear low density polyethylene having a density of 0.922 g/cm$^3$ and a melt index of 12 dg/min and the dimethyl polysiloxane may be PS343 polysiloxane from Petrach Systems Inc. described above. As is disclosed in the application of P.V. Gudelis, the ratios of the components may have a significant effect on the extrudability of the composition, and in this instance use of the blend in a 70:30 ratio is less preferred.

It is preferred in the process of P.V. Gudelis that the first and second fractions not be combined as aging effects may be observed, which are believed to be associated with interactions between the dimethyl polysiloxane and the vinyl silane grafted on the polyolefin. In addition, compositions containing high amounts of dimethyl polysiloxane tend to have poor processing characteristics. Use of two, or more, fractions maintains the dimethyl polysiloxane and grafted vinyl silane separated into major and minor portions in different fractions being fed to the extruder, with consequent improvements in the release properties of the resultant film. It is, however, believed to be important to have dimethyl polysiloxane and vinyl silane in both of the fractions in order to improve the curing of the resultant, extruded, composition. Grafting of vinyl silane onto the polyolefin is believed to improve compatibility of the composition during processing.

If the components are fed in part directly into the extruder e.g. using a cavity transfer mixer, then higher levels of for example dimethyl polysiloxane may be used, which may be advantageous to the properties of the product that is obtained.

In the process of the present invention, film formed from polyolefin and the dimethyl siloxane is subjected to a corona discharge. The corona discharge is applied to the film after formation of the film, preferably shortly after formation of the film e.g. prior to the film being wound up, and prior to the film being subjected to significant amounts of moisture. In preferred embodiments, the corona discharge is formed between two elongated electrodes, using techniques that are known to those skilled in the art. The film is passed between the electrodes while the corona discharge is formed between the electrodes. As is illustrated hereinafter, subjecting the release film to a corona discharge results in a release film having superior release characteristics compared with film that has not been so treated. The film may conveniently be treated at the speeds at which film is extruded from an extruder in the manufacture thereof. In preferred embodiments of the present invention, the release film subjected to the corona discharge is a release film of the type disclosed by P.V. Gudelis.

The corona-discharge treated release films of the invention may be used in a variety of end-uses. For example, the film may be in the form of a film that is peelable from another substrate, especially paper. Other examples include carpets especially squares of carpet having adhesive backings, medical and sanitary adhesive strips, two-sided carpet tape, adhesive gasketing and the like. Such films usually require that the layer of adhesive material be readily removed from the release film and then the layer be adhered to another substrate. In the case of a label, the label must be removable from the release film and then be adherable to another substrate e.g. an envelope. The release films may also be used for protection of surfaces that are sensitive to contamination by dust or the like.

The invention is illustrated by the following examples:

Example I

A series of compositions were prepared by feeding an admixture to a Berstorff twin screw extruder, melt-compounding the admixture and extruding the resultant composition in the form of film. The film was then subjected to a number of tests using the following procedures:

(a) melt uniformity was measured by visual examination of a molten web of the composition that was being extruded from the extruder;

(b) gauge uniformity was obtained by measuring the thickness of the film having a nominal thickness of about 25 microns at a number of locations across the film and at several positions along the length of the film;

(c) release performance was measured as follows: A section having a length of approximately 30 cm was cut from the film, with care being taken to avoid contamination with dirt or grease from handling of the section. Three samples, each 3.75 cm × 15 cm, were cut from the section, with the length of the samples being parallel to the machine direction of the section.

A strip of Johnson & Johnson adhesive tape measuring 2.5 cm × 15 cm was then applied to the samples, which were then subjected to a pressure of 17.6 g/cm$^2$. In procedure A, the sample was maintained under pressure for one minute at ambient temperature, and in procedure B the sample was maintained under pressure for 20 hours at 70° C. The "aged" samples thus obtained were placed in an Instron* apparatus and pulled apart at a 180° angle using a cross-head speed of 30 cm/min; the result obtained is referred to herein as "release force". The strip of tape removed from the sample was then applied to a stainless steel plate and a pressure of 17.6 g/cm² was applied for one minute; the stainless steel plate had been previously cleaned with acetone. The tape was then pulled from the plate using the Instron and the result is referred to herein as "adhesion". * denotes trade mark The compositions fed to the extruder were as follows, all percentages being by weight and all compositions being prepared in batches of at least 50kg:

Composition I 97.10% Sclair ® 68A high density (density 0.955 g/cm³, melt index 12 dg/min) polyethylene;
2.84% dimethyl polysiloxane, silanol terminated, 1000 centistokes (cSt) at 25° C.;
0.06% vinyl triethoxy silane.

Composition II 97.10% Sclair ® 68A polyethylene;
2.84% dimethyl polysiloxane, silanol terminated, 1000cSt at 25° C.;
0.06% Silcat R cross-linking chemical (vinyl trimethoxy silane containing organic peroxide and cross-linking catalyst).

Composition III

Component A 93.96% Sclair ® 61B polyethylene (density 0.922 g/cm³, melt index 12 dg/min) polyethelene;
6.00% dimethyl polysiloxane, silanol terminated, 1000cSt at 25° C.; 0.05% Silcat R Component B 93.46% Sclair ® 61B linear low density; 6.00% dimethyl polysiloxane, silanol terminated, 1000cSt at 25° C.;
0.50% vinyl triethoxy silane;
0.04% Silcat R.

Composition IV

Component A 93.98 % Sclair ® 61B polyethylene;
6.00% dimethyl polysiloxane, silanol terminated, 1000 cSt at 25° C.;
0.02% Silcat R Component B 94.46% Sclair ® 61B polyethylene; 5.00% dimethyl polysiloxane, silanol terminated, 1000 cSt at 25° C.;
0.50% vinyl triethoxy silane
0.04% Silcat R.

Composition V

Component A 94.00% Sclair ® 61B polyethylene;
5.60% dimethyl polysiloxane, silanol terminated, 1000cSt at 25° C.;
0.40% vinyl triethoxy silane Component B 95.52% Sclair ® 61B polyethylene;
4.36 % dimethyl polysiloxane, silanol terminated, 1000 cSt at 25° C.;
0.08% vinyl triethoxy silane;
0.04% Silcat R.

The results obtained are shown in Table I. The results show effects on extrudability and release/adhesion properties of film obtained according to the invention, and from comparative compositions.

TABLE I

| Run No. | Composition | Screw speed (rpm) | Screw Pressure (kg/cm²) | Rate (g/min) | Melt Uniformity |
|---|---|---|---|---|---|
| 1 | I | 78 | 50 | 395 | poor |
| 2 | II | 31 | 71 | 430 | excellent |
| 3 | III A/B 50:50 | 31 | 50 | 410 | excellent |
| 4 | IV A/B 60:40 | 62 | 43 | 395 | excellent |
| 5 | IV A/B 50:50 | 54 | 50 | 385 | excellent |
| 6 | IV A/PE* 50:50 | 58 | 29 | 385 | poor |
| 7 | PE | 27 | 57 | 445 | excellent |
| 8 | V A (100%) | 79 | 21 | 440 | poor |
| 9 | V B (100%) | 30 | 52.7 | 415 | excellent |
| 10 | V A/B 60:40 | 57 | 28.1 | 440 | excellent |
| 11 | V A/PE 60:40 | 71 | 35.2 | 440 | poor |

*PE = Sclair ® 61B polyethylene
NB Runs 1, 6, 7, 8 and 11 are comparative runs.

| Run No. | Release (g/2.54 cm) | Adhesion (g/2.54 cm) | Gauge Uniformity (microns) |
|---|---|---|---|
| 1 | 300* | 350* | 12-75 |
| 2 | 150* | 350* | 35-56 |
| 3 | 78<br>46*<br>190** | 336<br>263*<br>457** | 25-30 |
| 4 | 78<br>13*<br>148** | 187<br>258*<br>418** | 25-30 |
| 5 | 77<br>18*<br>178** | 186<br>251*<br>428** | 25-30 |
| 6 | 55<br>5* | 195<br>253* | 12-75 |
| 7 | 150<br>160*<br>353** | 245<br>218*<br>305** | 25-30 |
| 8 | 48<br>3*<br>144** | 139<br>260*<br>369** | 0-75 |
| 9 | 122<br>92*<br>287** | 168<br>269*<br>371** | 25-30 |
| 10 | 52<br>5*<br>123** | 161<br>260*<br>338** | 25-30 |
| 11 | 73<br>9*<br>227** | 169<br>274*<br>500** | 12-75 |

*measured by hand using a scale, after aging for one minute at ambient temperature;
**Sample prepared by procedure A;
***Sample prepared by procedure A and treated with a corona discharge prior to testing;
****Sample prepared by procedure B and treated with corona discharge prior to testing.

EXAMPLE II

The composition of Run 10 was extruded using a screw speed of 76 rpm. The extrusion rate obtained was 1588 g/min. The film, after treatment with a corona discharge, had a release of 26 and adhesion of 370; release and adhesion referred to in this and succeeding Examples are as defined in Example I and were measured using Procedure A.

The composition of Run 10 was also extruded, but using a ration of component A:component B of 70:30 (instead of 60:40). The extrusion rate obtained was 394 g/min, and the film, after treatment with a corona discharge, had a release of 15 and adhesion of 325.

This example shows that the ratio of the components fed to the extruder may have a substantial effect on the rate of extrusion that is obtained. The reduction in rate of extrusion is believed to be due to slippage of the screw in the extruder.

EXAMPLE III

Film was extruded from a blend of Component A (92% by weight of Sclair ® 61B polyethylene and 8% by weight of silanol terminated dimethyl polysiloxane (1000 cSt)) and Component B (95.5% by weight of Sclair ® 61B polyethylene, 4.4% by weight of the silanol terminated dimethyl polysiloxane, 0.04% by weight of Silcat R vinyl silane composition and 0.06% by weight of vinyl triethoxy vinyl silane).

When Components A and B were blended in a ratio of 60:40 and the screw speed was 89 rpm, the output was 414 g/min. The film obtained, after treatment with a corona discharge, had a release of 31 and an adhesion of 348. When the components were blended in a ratio of 70:30 and the screw speed was 89 rpm, the output was 355 g/min and the film obtained, after treatment with a corona discharge, had a release of 21 and an adhesion of 318.

EXAMPLE IV

The following composition was extruded from an extruder in the form of film:

94% by weight of polyethylene (90% by weight of Sclair ® 2111 linear low density polyethylene, which has a density of 0.924 g/cm$^3$ and a melt index of 20 dg/min, and 10% by weight of high pressure ethylene homopolymer having a density of 0.918 g/cm$^3$ and a melt index of 7 dg/min);

6% by weight of silanol terminated dimethyl polysiloxane (1000 cSt);

0.05% by weight of dibutyl tin dilaurate 0.03% by weight of vinyl triethoxy silane; and 0.025% by weight of Lupersol 101 organic peroxide.

The liquid components of the composition were fed directly into the extruder, with grafting of vinyl silane onto the polyethylene occurring in the extruder. Thus this composition was a single component composition, in contrast to the two component composition of the previous example.

At a screw speed of 30 rpm, the extrusion rate was 457 g/min. The resultant film, after treatment with a corona discharge, had a release of 32 and an adhesion of 290.

EXAMPLE V

The following composition was extruded from an extruder in the form of film:

94% by weight of polyethylene (90% by weight of Sclair ® 2111 linear low density polyethylene and 10% by weight of the high pressure ethylene homopolymer of Example IV);

6% by weight of silanol terminated dimethyl polysiloxane (750 cSt);

0.05% by weight of dibutyl tin dilaurate 0.03% by weight of vinyl triethoxy silane; and 0.025% by weight of Lupersol 101 organic peroxide.

The liquid components of the composition were fed directly into the extruder, with grafting of vinyl silane onto the polyethylene occurring in the extruder, as in the previous example.

At a screw speed of 30 rpm, the extrusion rate was 458 g/min. The resultant film, after treatment with a corona discharge, had a release of 77 and an adhesion of 273.

EXAMPLE VI

The following composition was extruded from an extruder in the form of film:

82.7% by weight of Sclair ® 2111 linear low density polyethylene;

9.19% by weight of the high pressure ethylene homopolymer of Example IV;

8% by weight of silanol terminated dimethyl polysiloxane (1000 cSt);

0.05% by weight of dibutyl tin dilaurate 0.03% by weight of vinyl triethoxy silane; and 0.025% by weight of Lupersol 101 organic peroxide.

The liquid components of the composition were fed directly into the extruder, with grafting of vinyl silane onto the polyethylene occurring in the extruder, as in the previous example.

At a screw speed of 50 rpm, the extrusion rate was 458 g/min. A good web with little gel was obtained. The resultant film, after treatment with a corona discharge, had a release of 33 and an adhesion of 316 when measured by the method of Procedure A of Example I, and 87 and 504, respectively, when measured by the method of Procedure B.

The above procedure was repeated using a polysiloxane having a viscosity of 750 cSt. At a screw speed of 60 rpm, the extrusion rate was 489 g/min. A good web with no gel was obtained. The resultant film, after treatment with a corona discharge, had a release of 40 and an adhesion of 316 when measured by the method of Procedure A, and 80 and 538, respectively, when measured by the method of Procedure B.

EXAMPLE VII

The following composition was extruded from an extruder in the form of film:

80.9% by weight of Sclair ® 2111 linear low density polyethylene;

8.99% by weight of the high pressure ethylene homopolymer of Example IV;

10% by weight of silanol terminated dimethyl polysiloxane (1000 cSt);

0.05% by weight of dibutyl tin dilaurate 0.04% by weight of vinyl triethoxy silane; and 0.025% by weight of Lupersol 101 organic peroxide.

The liquid components of the composition were fed directly into the extruder, with grafting of vinyl silane onto the polyethylene occurring in the extruder, as in the previous example.

At a screw speed of 50 rpm, the extrusion rate was 453 g/min. The web obtained had a little gel, but surging was noted during extrusion. The resultant film, after treatment with a corona discharge, had a release of 20 and an adhesion of 336 when measured by the method of Procedure A, and 68 and 465, respectively, when measured by the method of Procedure B.

The above procedure was repeated using a polysiloxane having a viscosity of 750 cSt. At a screw speed of 60 rpm, the extrusion rate was 417 g/min. The resultant film, after treatment with a corona discharge, had a release of 28 and an adhesion of 346 when measured by the method of Procedure A, and 74 and 478, respectively, when measured by the method of Procedure B.

I claim:

1. A process for the formation of a film having release characteristics, said process comprising:

(a) admixing in an extruder a composition comprising (i) a polyolefin in molten form, (ii) a dimethyl polysiloxane having functional end-groups, (iii) an agent for the grafting of vinyl silane compounds onto the polyolefin, (iv) at least one vinyl silane compound in an amount that is equal to or in excess of the stoichiometric amount that may be grafted onto the polyolefin using the grafting agent of (iii), and (v) a moisture curing agent;

(b) extruding said composition through a die at a temperature above the melting point of the polyolefin and so as to effect grafting of the vinyl silane onto the polyolefin;

(c) subjecting the film thus formed to a corona discharge; and (d) subjecting the resultant film to moisture.

2. The process of claim 1 in which the dimethyl polysiloxane is fed directly into a melt zone of the extruder.

3. The process of claim 1 in which at least two compositions which in combination form the composition to be extruded, are each fed to the extruder.

4. The process of claim 1 in which the composition fed to the extruder is in the form of two fractions, the first fraction comprising polyolefin, vinyl silane and dimethyl polysiloxane, said polyolefin optionally having at least one vinyl silane compound grafted thereon in an amount that is a minor fraction of the stoichiometric amount that may react with the functional groups on the polysiloxane; and the second fraction comprising polyolefin, vinyl silane and dimethyl polysiloxane, said polyolefin having at least one vinyl silane compound grafted thereon in an amount that is at least a major fraction of the stoichiometric amount that may react with the functional groups on the polysiloxane.

5. The process of claim 1 in which the polyolefin is selected from the group consisting of copolymers of ethylene with a hydrocarbon alpha-olefin having from 4–8 carbon atoms and homopolymers of ethylene, said polyolefins having a density in the range of 0.900 to 0.970 g/cm$^3$, and mixtures thereof.

* * * * *